US012572890B2

(12) United States Patent
Kuo et al.

(10) Patent No.: US 12,572,890 B2
(45) Date of Patent: Mar. 10, 2026

(54) COMMUNICATIONS SERVER APPARATUS AND METHOD FOR SIMULATING SUPPLY AND DEMAND CONDITIONS RELATED TO A TRANSPORT SERVICE

(71) Applicant: GRABTAXI HOLDINGS PTE. LTD., Singapore (SG)

(72) Inventors: Kelly Kuo, Singapore (SG); Xin Xu, Singapore (SG); Ashwin Madelil, Singapore (SG); Chao Xie, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 218 days.

(21) Appl. No.: 18/009,616

(22) PCT Filed: Aug. 27, 2021

(86) PCT No.: PCT/SG2021/050517
§ 371 (c)(1),
(2) Date: Dec. 9, 2022

(87) PCT Pub. No.: WO2022/050898
PCT Pub. Date: Mar. 10, 2022

(65) Prior Publication Data
US 2023/0214767 A1 Jul. 6, 2023

(30) Foreign Application Priority Data
Sep. 1, 2020 (SG) ............................. 10202008428S

(51) Int. Cl.
*G06Q 10/087* (2023.01)
(52) U.S. Cl.
CPC .................................. *G06Q 10/087* (2013.01)

(58) Field of Classification Search
CPC ...... G06Q 10/087; G06Q 10/02; G06Q 10/04; G06Q 10/063; G06Q 50/40; G06Q 30/0202
(Continued)

(56) References Cited

U.S. PATENT DOCUMENTS 9,424,515 B2 8/2016 Atlas
9,984,574 B2 5/2018 Laetz
(Continued)

FOREIGN PATENT DOCUMENTS

CN       110264706          9/2019
CN       110264706 A    *   9/2019    ......... G06F 16/2465

OTHER PUBLICATIONS

Cocca, Michele et al. On Car-Sharing Usage Prediction with Open Socio-Demographic Data. Electronics; Basel vol. 9, Iss. 1, (2020): 72. (Year: 2020).*
(Continued)

*Primary Examiner* — Fawaad Haider
(74) *Attorney, Agent, or Firm* — Maschoff Brennan

(57) ABSTRACT
A communications server apparatus for simulating supply and demand conditions related to a transport service and deriving associated spatio-temporal prediction data, the communications server apparatus comprising a processor and a memory, and being configured, under the control of the processor, to execute instructions stored in the memory to: obtain supply and demand data, said supply data comprising service provider location and availability data and said demand data comprising user bookings data; generate, using said supply and demand data, aggregated supply and demand data comprising a plurality of data records associated with a plurality of respective predetermined time periods, each record being representative of an available supply pool of one or more service provider types in one of a
(Continued)

plurality of regions, and demand therefor, during the respective predetermined time period; generate, using said supply and demand data, probability data for each of said plurality of regions and supply pools in relation to respective predetermined time periods, said probability data comprising probability values representative of a likelihood of demand associated with respective time slot/supply pool/region combinations; perform a simulation of supply and demand conditions in said plurality of regions by mapping said aggregated supply and demand data to said probability data in a trained forecasting model and generating prediction data for each of said plurality of regions and supply pools, said prediction data being representative of a probability that a service provider will receive a user booking in a specified region within a predetermined period of time; and output said prediction data for display on a service provider communications device.

13 Claims, 12 Drawing Sheets

(58) Field of Classification Search
USPC ........................................................ 705/28
See application file for complete search history.

(56) References Cited

U.S. PATENT DOCUMENTS

| | | | |
|---|---|---|---|
| 10,192,448 B2 | 1/2019 | Al. | |
| 10,360,521 B2 | 7/2019 | Wang | |
| 10,557,713 B1 * | 2/2020 | Yao ..................... | G01C 21/3492 |
| 2016/0335576 A1 | 11/2016 | Peng | |
| 2017/0227370 A1 | 8/2017 | O'Mahony et al. | |
| 2018/0300655 A1 | 10/2018 | Wang et al. | |
| 2019/0272758 A1 | 9/2019 | Marueli et al. | |
| 2019/0347674 A1 | 11/2019 | Sankar et al. | |
| 2020/0133306 A1 | 4/2020 | Chadha et al. | |

OTHER PUBLICATIONS

Curry, Michael et al. Mix and Match: Markov Chains & Mixing Times for Matching in Rideshare. 2019. (Year: 2019).*
Xu et al., "Real-time Prediction of Taxi Demand Using Recurrent Neural Networks", Dec. 19, 2017, pp. 1-10.
International Preliminary Report for Application No. PCT/SG2021/050517, mailed Mar. 23, 2022 (4 pages).
Written Opinion for Application No. PCT/SG2021/050517, mailed Oct. 5, 2021, (6 pages).
International Search Report for Application No. PCT/SG2021/050517, mailed Oct. 5, 2021 (3 pages).

* cited by examiner

Figure 2:
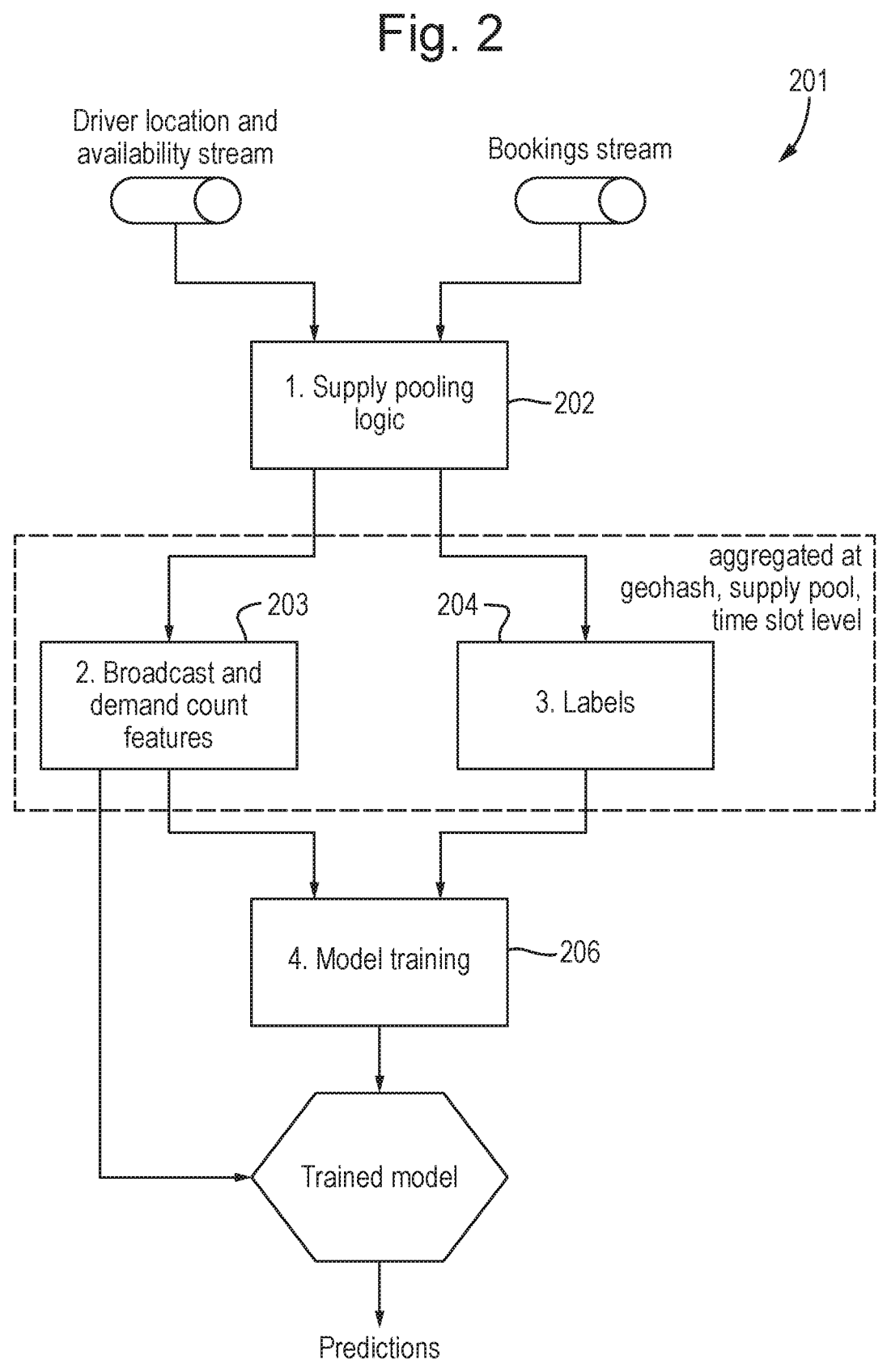

Driver location and availability stream

Bookings stream

1. Supply pooling logic — 202 aggregated at geohash, supply pool, time slot level

203

204

2. Broadcast and demand count features

3. Labels

4. Model training — 206

Trained model

Predictions

Time slot: 00:02 to 00:04

$P_A(Z) = \frac{1}{2} = 0.5$ $P_B(Z) = 1/1 = 1$ $P_D(Z) = 0/1 = 0$

Time slot: 00:02 to 00:04

$P_A(Z) = 0$ $P_D(Z) = 0$

Time slot: 00:02 to 00:04

$P_A(Z) = {}^1/_2 = 0.5$ $P_B(Z) = 1/1 = 1$ $P_D(Z) = 3/4 = 0.75$

Time slot: 00:02 to 00:04

$P_A(Z) = 2/2 = 1$ $P_D(Z) = 6/6 = 1$

Time slot: 00:02 to 00:04

$P_A(Z) = 1/3 = 0.33$ $P_B(Z) = 1/2 = 0.5$ $P_D(Z) = 3/5 = 0.6$

Time slot: 00:02 to 00:04

$P_A(Z) = 2/3 = 0.667$ $P_D(Z) = 6/7 = 0.857$

| $((t_1 - 15) - t_1)$ | | | | |
|---|---|---|---|---|
| | G1 | G2 | G3 | |
| [B,C] | $P_{t,G1,S_1}$ | $P_{t,G2,S_1}$ | ... | |
| [A,C] | $P_{t,G1,S_2}$ | $P_{t,G2,S_2}$ | ... | |

| t - Δt to t | | | | |
|---|---|---|---|---|
| | G1 | G2 | G3 | .... |
| [B,C] | | | | |
| [A,C] | | | | |

(Fig. 4b)

| t to (t + X) | | | | |
|---|---|---|---|---|
| | G1 | G2 | G3 | .... |
| [B,C] | | | | |
| [A,C] | | | | |

Driver App —104

Passenger App —106

—100

Driver location and availability stream

306

Bookings stream 309

322 Supply pools

Supply pool generation

Driver location and bookings datastore

705 Stream Processing

Aggregated demand and supply stream

309

Labels —144

126

Archive 706

Model training —146

Scheduled periodically

Trained model —708

Predictions —709

702 Heatmap service

710 Sort term Database

Long term Database —720

Request     Return

106

Driver App

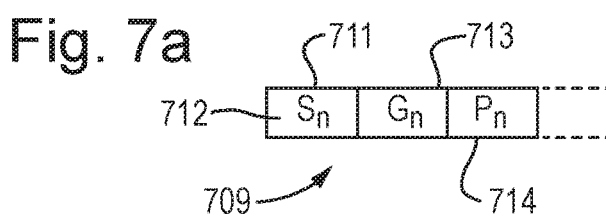

COMMUNICATIONS SERVER APPARATUS AND METHOD FOR SIMULATING SUPPLY AND DEMAND CONDITIONS RELATED TO A TRANSPORT SERVICE

TECHNICAL FIELD

The invention relates generally to the field of communications. One aspect of the invention relates to a communications server apparatus for simulating supply and demand conditions related to a transport service and deriving associated spatio-temporal prediction data. Another aspect of the invention relates to a method, performed in a communications server for deriving a quantum modifier for simulating supply and demand conditions related to a transport service and deriving associated spatio-temporal prediction data. Another aspect of the invention relates to a computer program product comprising instructions therefor. Another aspect of the invention relates to a computer program comprising instructions therefor. Another aspect of the invention relates to a non-transitory storage medium storing instructions therefor. Another aspect of the invention relates to a communications system for simulating supply and demand conditions related to a transport service and deriving associated spatio-temporal prediction data.

One aspect of the invention has particular, but not exclusive, application in taxi and ride-hailing. However, it is to be understood that aspects of the invention have application in various related and other fields, such as food delivery services and, indeed, any other shared economy applications in which there is a spatio-temporal distribution of demand and supply of services or assets.

BACKGROUND

It is known that, in fields such as ride-hailing, drivers will go to great lengths to form accurate expectations about where their time will be best spent looking for passengers. However, drivers have incomplete knowledge about where taxis are most likely to be needed. In addition to requiring taxi drivers to work harder, this incomplete information produces other negative effects. Taxi drivers must search longer per fare, which produces more traffic on congested streets as well as more noise and atmospheric pollution. Drivers who exert greater effort per fare are more likely to suffer from fatigue and to compete more aggressively for passengers, making the roads more dangerous. Finally, inefficient taxi allocation limits passengers' access to taxis.

U.S. Pat. No. 9,424,515 describes techniques for analysing contingencies in information predicting taxi demand and using these to generate information representative of current or future taxi demand.

However, this document does not consider the fact that certain drivers may only be able to service certain fares because of the type of vehicle they have. For example, if they have a 4-seater vehicle, they will not be able to pick up parties of more than 4 people. Furthermore, it does not effectively take into account the current location of any particular driver, because it does not generate driver-specific data, but simply provides taxi demand information within a specified area and the likelihood of quickly picking up a fare in that area (and where). The manner in which the forecasting and calculations are performed means that it does not allow for specific driver type or location to be taken into account when generating an output and, as such, each driver receives all of the information, irrespective of where they are currently located and/or whether their vehicle is of a type able to service the predicted fares. This leads to a display with a lot of information that is extraneous and irrelevant to some drivers, and makes the data difficult to use effectively.

SUMMARY

Aspects of the invention are as set out in the independent claims. Some optional features are defined in the dependent claims.

In at least some implementations of the apparatus disclosed herein, the final output may be a set of single values (or heatmap indicators) based on probability values, which carry spatio-temporal data and are service provider type specific. As a result, a single value carrying a large amount of data can be generated and updated in (near) real time and utilising minimal processing overhead. Furthermore, the apparatus can be configured such that a service provider only receives heatmap data specific to their type(s) and the general region in which they are located, and that data may simply indicate the likelihood (probability) of that service provider receiving a broadcast (booking) in a certain area of that region within the next predetermined time period (e.g. 15 minutes). This service provider specific data can be conveniently displayed on a service provider communications device, thereby making it quick and easy for the apparatus to indicate to a service provider where the greatest likelihood of receiving a booking within the next X minutes might be. The heatmap data can be generated and updated very quickly, and with a relatively low processing overhead, such that it can be achieved in (near) real time and displayed to the service provider whilst the information is still valid and useful.

Implementation of the techniques disclosed herein may provide significant technical advantages. The generation of supply pool logic that enables service providers to be grouped into types, significantly decreases processing overhead in terms of probability calculation and conditions simulation and forecasting, and also enables at least some implementations of the apparatus described herein to provide highly relevant heatmap data only to service providers flagged or recorded as belonging to the supply pool to which a probability relates. As such, each service provider receives a heatmap indicative of their own likelihood of receiving a broadcast (i.e. job) in a region within X minutes, without extraneous data cluttering their display. The use of an aggregated supply and demand data stream (rather than, for example, the raw data stream), has a significant positive effect on the efficiency of the resultant apparatus. The aggregation is performed both spatially and temporally. Thus, the aggregated supply and demand stream is, essentially, a set of data records, each record being associated with a predetermined time period and being representative of specific supply and demand in each of a number of regions during that time period. All data is captured in a compressed form, with extraneous data being discarded or ignored such that a large amount of supply and demand information is captured within a relatively small data set, which is further compressed by using supply pools derived from the above-mentioned logic pooling technique. The 'knock-on' effect of this is that, with an equally condensed probability data set, the mapping and simulation steps are simplified to the extent that the predictions data is generated and output in near real time and whilst it is still useful to the relevant service providers. This also means that the trained forecasting model can be updated with recent historical data quickly and efficiently, and with little or no 'down time'. Aggregating demand and supply information at the supply pool level creates a data stream that is aggregated to an appropriate extent, i.e. not too granular (e.g. individual driver, booking level) such that network traffic is very high, nor too aggregated, such that it is not useful enough for downstream pricing or demand shaping applications. Thus, whilst attaining the advantages noted above, the aggregated data stream, derived from a much larger data set, is sufficient to quickly and efficiently produce accurate forecasting data, without undue processing overhead.

In at least some implementations of the communications server apparatus described herein, an aggregated supply and demand data set and a so-called labels data set are mapped onto each other to create the forecasting model and subsequent predictions. Both data sets are, effectively, spatio-temporally aggregated which, once again this enables highly relevant information to be retained in an efficient manner, thereby allowing the system to handle large numbers of drivers and bookings in an efficient manner, discarding any irrelevant data, and enabling a single processor to perform the calculations and simulations necessary in near real time and without significant latency. The trained forecasting model can be updated regularly with up-to-date (historical) supply and demand data, so that it is always as accurate as possible.

In at least some of the techniques described herein, the probability calculation is adjusted for unusual circumstances, when supply and/or demand is low, thereby ensuring that the most accurate indicators are provided to the service providers at all times.

In at least some of the implementations of the communications server apparatus described herein, a model retraining pipeline may be implemented that monitors model performance and retrains if or when performance is deemed to have dropped below a predetermined threshold. Such model retraining pipeline facilitates the optimisation of resources when retraining the model, since training iterations can be optimised and timed for maximum impact. In some implementations, such model performance may be monitored and, when a drop in performance is detected, a correlation between the drop in model performance and the supply and/or demand conditions that caused the drop may be performed. In a model retraining process, the data on which good model performance is achieved and data on which poor model performance is detected can both be utilised in retraining the model. As such, supply and demand distributions within the forecasting model can be smoothed and shaped in order to avoid, or at least mitigate, issues caused by extreme anomalies in demand/supply patterns, in the same way as techniques may be provided for, say, electrical supply-load balancing or computer load balancing.

BRIEF DESCRIPTION OF THE DRAWINGS

FIG. 2 is a schematic process diagram illustrating an exemplary method for simulating a supply and demand condition related to transport services, and deriving associated spatio-temporal prediction data;

FIG. 7 is a schematic block diagram illustrating an exemplary communications system including a communications server apparatus for simulating a supply and demand condition related to transport services, and deriving associated spatio-temporal prediction data; and FIG. 7a is a schematic diagram illustrative of a data item transmitted to a heatmap service in an exemplary communications system for simulating a supply and demand condition related to transport services, and deriving associated spatio-temporal prediction data.

DETAILED DESCRIPTION

The techniques described herein are described primarily with reference to use in private hire transport and/or taxi and ride-hailing, but it will be appreciated that these techniques have a broader reach and cover other types of transportation services, including the transportation of documents and goods.

Figure 1:
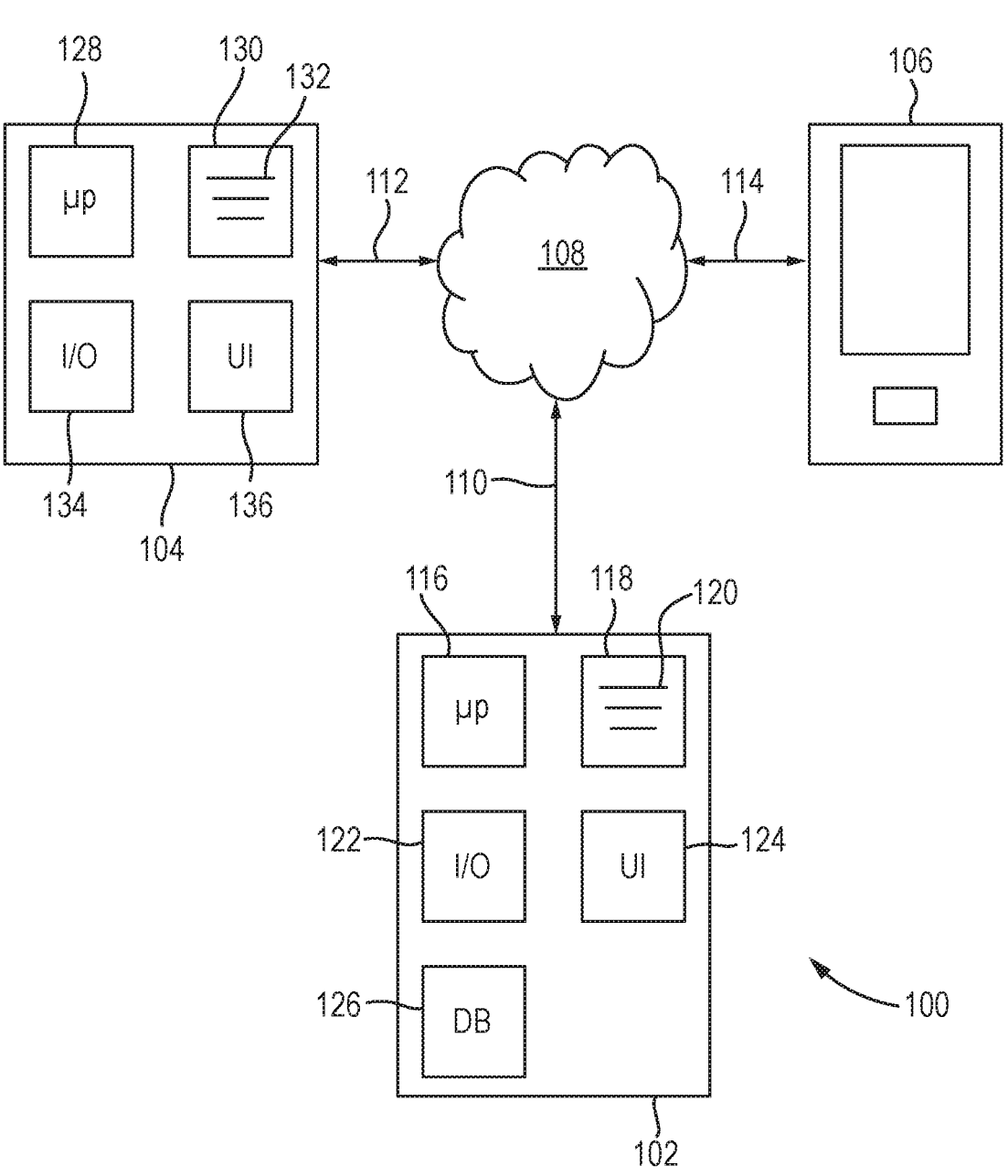
FIG. 1 is a schematic block diagram illustrating n exemplary communications system including a communications server apparatus for simulating a supply and demand condition related to transport services, and deriving associated spatio-temporal prediction data.

Referring first to FIG. 1, a communications system 100 is illustrated. Communications system 100 comprises communications server apparatus 102, user communications device 104 and service provider communications device 106. These devices are connected in the communications network 108 (for example the Internet) through respective communications links 110, 112, 114 implementing, for example, internet communications protocols. Communications devices 104, 106 may be able to communicate through other communications networks, such as public switched telephone networks (PSTN networks), including mobile cellular communications networks, but these are omitted from FIG. 1 for the sake of clarity.

Communications server apparatus 102 may be a single server as illustrated schematically in FIG. 1, or have the functionality performed by the server apparatus 102 distributed across multiple server components. In the example of FIG. 1, communications server apparatus 102 may comprise a number of individual components including, but not limited to, one or more microprocessors 116, a memory 118 (e.g. a volatile memory such as a RAM) for the loading of executable instructions 120, the executable instructions defining the functionality the server apparatus 102 carries out under control of the processor 116. Communications server apparatus 102 also comprises an input/output module 122 allowing the server to communicate over the communications network 108. User interface 124 is provided for user control and may comprise, for example, computing peripheral devices such as display monitors, computer keyboards and the like. Communications server apparatus 102 also comprises a database 126, the purpose of which will become readily apparent from the following discussion. In this embodiment, database 126 is part of the communications server apparatus 102, however, it should be appreciated that database 126 can be separated from communications server apparatus 102 and database 126 may be connected to the communications server apparatus 102 via communications network 108 or via another communications link (not shown).

User communications device 104 may comprise a number of individual components including, but not limited to, one or more microprocessors 128, a memory 130 (e.g. a volatile memory such as a RAM) for the loading of executable instructions 132, the executable instructions defining the functionality the user communications device 104 carries out under control of the processor 128. User communications device 104 also comprises an input/output module 134 allowing the user communications device 104 to communicate over the communications network 108. User interface 136 is provided for user control. If the user communications device 104 is, say, a smart phone or tablet device, the user interface 136 will have a touch panel display as is prevalent in many smart phone and other handheld devices. Alternatively, if the user communications device is, say, a desktop or laptop computer, the user interface may have, for example, computing peripheral devices such as display monitors, computer keyboards and the like.

Service provider communications device 106 may be, for example, a smart phone or tablet device with the same or a similar hardware architecture to that of user communications device 104. Service provider communications device 106 may comprise a number of individual components including, but not limited to, one or more microprocessors 138, a memory 140 (e.g. a volatile memory such as a RAM) for the loading of executable instructions 142, the executable instructions defining the functionality the service provider communications device 106 carries out under control of the processor 138. Service provider communications device 106 also comprises an input/output module (which may be or include a transmitter module/receiver module) 144 allowing the service provider communications device 106 to communicate over the communications network 108. User interface 146 is provided for user control. If the service provider communications device 106 is, say, a smart phone or tablet device, the user interface 146 will have a touch panel display as is prevalent in many smart phone and other handheld devices. Alternatively, if the user communications device is, say, a desktop or laptop computer, the user interface may have, for example, computing peripheral devices such as display monitors, computer keyboards and the like.

In one embodiment, the service provider communications device 106 is configured to push data representative of the service provider (e.g. service provider identity, location and so on) regularly to the communications server apparatus 102 over communications network 108. In another, the communications server apparatus 102 polls the service provider communications device 106 for information. In either case, the data from the service provider communications device 106 (also referred to herein as 'driver location and availability data' or 'supply' data) are communicated to the communications server apparatus 102 and stored in relevant locations in the database 126 as historical data. For the avoidance of doubt, such supply data may include any one or more of, numbers of available service providers in a particular area or region, times of day associated with the service provider availability, respective service provider types, and even idle times associated with available service providers and types. The historical data received from the service provider communications device 106, and stored in the database 126, includes, amongst other things, data indicative of service providers' location and availability at a given time. This historical data, i.e. supply data, is stored against the respective driver identity data which may include, amongst other things, type of vehicle (e.g. 6-seater, taxi, private hire).

In one embodiment, the user communications device 104 is configured to push data representative of the user (e.g. user identity, location, transport requirements, and so on) regularly to the communications server apparatus 102 over communications network 108. In another, the communications server apparatus 102 polls the service provider communications device 104 for information. In either case, the data from the user communications device 104 (also referred to herein as 'bookings data') are communicated to the communications server apparatus 102 and stored in relevant locations in the database 126 as historical data. For the avoidance of doubt, such bookings data may include any one or more of numbers of bookings in a particular area or region, service provider types associated with those bookings, numbers of passengers and/or type of cargo, times of day at which the bookings are made/required to be serviced, etc. The historical data received from the user communications device 104 is stored in the database 126, includes, amongst other things, location and vehicle type associated with each vehicle booking made. As described in more detail below, historical supply and demand data in the database 126 may be used, within a forecasting model, for deriving simulation data representative of a real-time future supply and demand pattern so as to generate data representative of a probability that a driver will secure a passenger booking at a specified location within a some specified time.

Figure 1A:
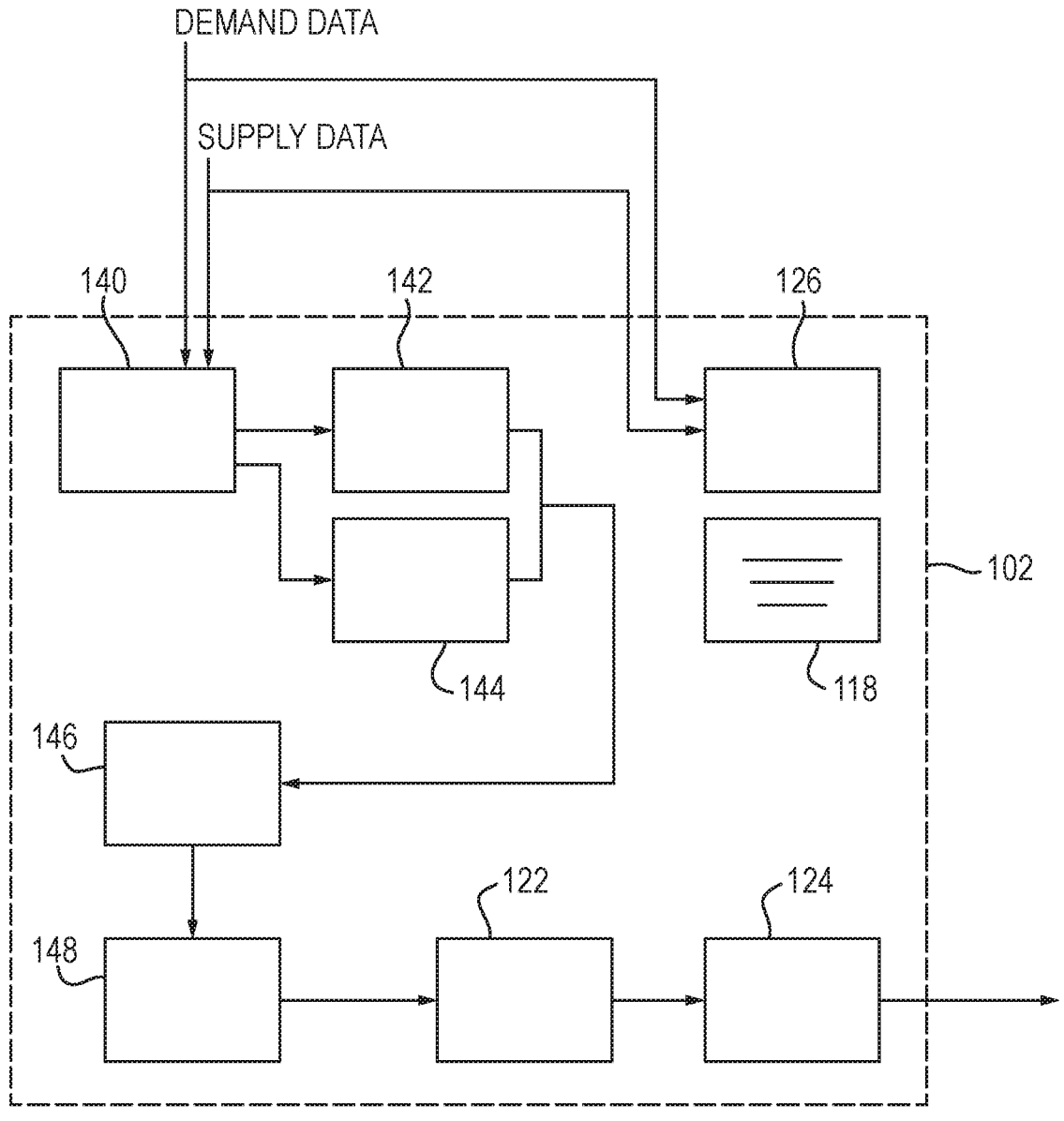
FIG. 1a is a schematic block diagram illustrating an exemplary communications server apparatus for simulating a supply and demand condition related to transport services, and deriving associated spatio-temporal prediction data.

Referring to FIG. 1a of the drawings, the communications server apparatus 102 may further comprise a supply pooling logic processor 140, communicably coupled to a broadcast and demand count features processor 142 and a labels processor 144. A model training processor 146 receives inputs from the broadcast and demand count features processor 142 and the labels processor 144 and outputs model data to a forecasting processor 148. The forecasting processor 148 additionally receives data from the broadcast and demand count features processor 142 and outputs prediction data to be transmitted, via the input/output module 122 and user interface 124, to selected user communications devices 104 for display. It should be appreciated that one or more or all of the supply pooling logic processor 140, the broadcast and demand count features processor 142, the labels processor 144, the model training processor 146 and forecasting processor 148 may be implemented by a single processing device (illustrated and referenced by numeral '116' in FIG. 1), or they may be implemented by two or more processing devices, depending on the desired architecture of the communications system 100.

It should also be appreciated that one or more or all of the supply pooling logic processor 140, the broadcast and demand processor 142, the labels processor 144, the model training processor 146 and the forecasting processor 148 may be implemented in the communications server 102, or one or more of them may be implemented in a remote processing facility (not shown) communicably coupled (for example, wirelessly, over a communications network) to the communications server 102.

Referring to FIG. 2 of the drawings, an exemplary process or technique for generating and updating (e.g. periodically) such a forecasting model will be described. In FIG. 2, there is provided a high level overview of the process steps associated with generating and/or updating the forecasting model. In a first step 201, the driver location and availability data is obtained from the service provider communications device 106 and the bookings data is received from the user communications device 104. In another step 202, a supply pooling logic determining process is performed by a supply pooling logic determining processor in order to group drivers into disjoint sets based on the vehicle types flagged against their identity data. It will be appreciated that drivers within the same set should be as similar to each other as possible in terms of the types of jobs or fares they may be able to secure.

In another process step 203, broadcast and demand count feature data is generated. Broadcast and demand count feature data may comprise at least tracking data indicative of available drivers (at any specified time), their respective locations and the time it takes for them to secure a job that has been received via the bookings data from the user communications device 104. In yet another process step 204, labels data is generated. Each label of a set of labels data may comprise an estimate of probability (for each available driver) of securing a job in some predetermined period of time (e.g. X minutes) for each dataset comprising the supply pool to which the respective driver is assigned, specified location or region and real timeslot. The broadcast count data and labels data from steps 203 and 204 respectively are fed to a model training process 206, where the identifiers from the broadcast count data and the labels data are matched up and used as respective training sets and used in the model training process to generate prediction data indicative the probabilities of receiving a fare or job in a specified location within the next (e.g.) X minutes, based on driver location and availability data and bookings data collected in the last Δt minutes for that specified location. The model training process may utilise any one or more of a number of forecasting models, such as gradient boosted decision trees, multi-layer perceptrons, convolutional neural networks with long short term memory layers, ARIMA models, etc.

It will be readily appreciated from, and elucidated by, the following description that the process for generating the forecasting model can be used, initially, with historical data, to generate the initial forecasting model, which can then be periodically (or even continuously in near real-time) updated using a driver location and availability (supply) data stream obtained from the service provider communications device 106 and a bookings (demand) data stream obtained from one or more user communications devices 106 whilst the system is being used to book and allocate fares.

The prediction data obtained from the forecasting model, whilst the system is in use, can be used to generate heatmap data that is transmitted to the user communication device 104 for display in the form of a heatmap, wherein a map of a specified region (comprising multiple locations) can be displayed, including spatio-temporal indicators defining locations clusters of locations where a user can expect to secure a job within a predetermined time. However, it will be readily appreciated that the prediction data may, in other embodiments, be displayed in an alternative manner.

The supply pooling logic determining (or updating) processor 140 derives logic that groups available drivers into disjoint sets based on vehicle types they have flagged against their identity data. The purpose of the supply pooling logic is to aggregate counts for each set such that, ultimately, the same 'heatmap', can be displayed to drivers within the same set. The supply pooling logic processor receives driver location and availability data and bookings data from a driver location and bookings datastore (referenced hereinafter) in the database 126 of the communications server apparatus 102. This data is obtained from the driver location and availability data and the bookings data received from the service provider communications device 104 and the user communications device 106 whilst the communications system 100 is in use; and, essentially, comprises regularly-updated driver location/availability and bookings data such that the supply pool logic can be regularly updated to reflect current conditions.

Figure 3:
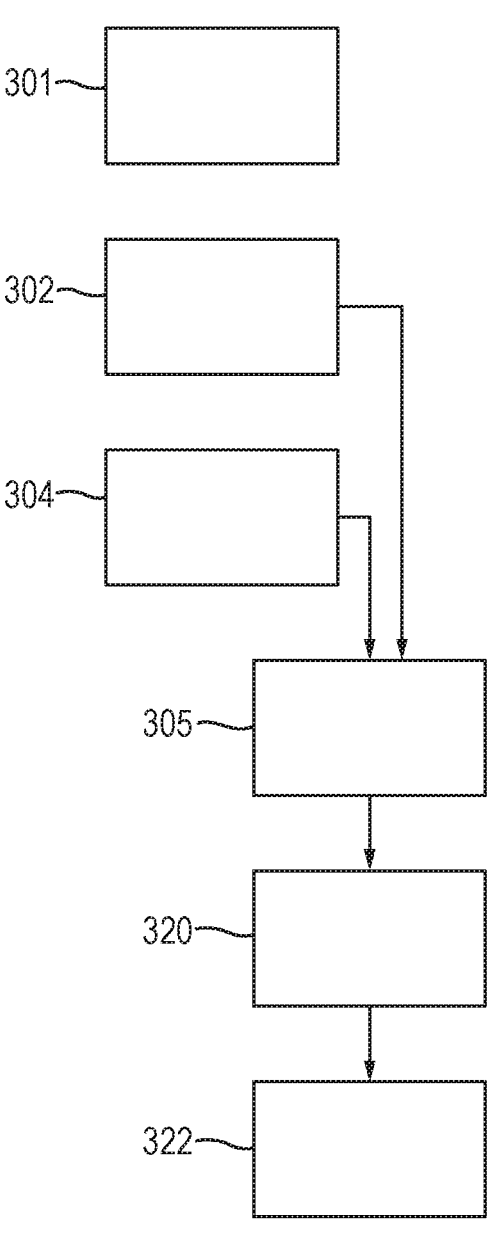
FIG. 3 is a schematic flow diagram illustrating a method for generating supply pooling logic for use in an exemplary method for simulating a supply and demand condition related to transport services, and deriving associated spatio-temporal prediction data.

FIG. 3 is a flow diagram illustrating the method steps associated with a supply pooling logic determining technique performed by the supply pooling logic processor. In a first step 301 of the method, 'major' taxi types [e.g. type A, type B, type C] are determined for each region, e.g. city. The conditions for qualifying a taxi type as 'major' may be set in a number of different ways. In one embodiment, the conditions may be set such that, as a first condition for a specified taxi type, A, B or C, to qualify as 'major, the number of bookings for that taxi type must make up at least some first predetermined proportion (a %) of bookings in the city. Furthermore, once taxi types have been ranked from highest booking proportion to lowest booking portion, the taxi types ranked above a taxi type meeting the first condition, must make up less than some second predetermined proportion (0%) of bookings in the respective city. In another step 302, using all available driver data for a city, the active taxi type combinations are recorded for each of a number of timeslots or snapshots of time. In another step 304, a taxi-type profile of bookings served by each combination of active taxi types is generated, wherein the proportion of bookings served by each active taxi type (during a particular timeslot) is determined.

Figure 3A:
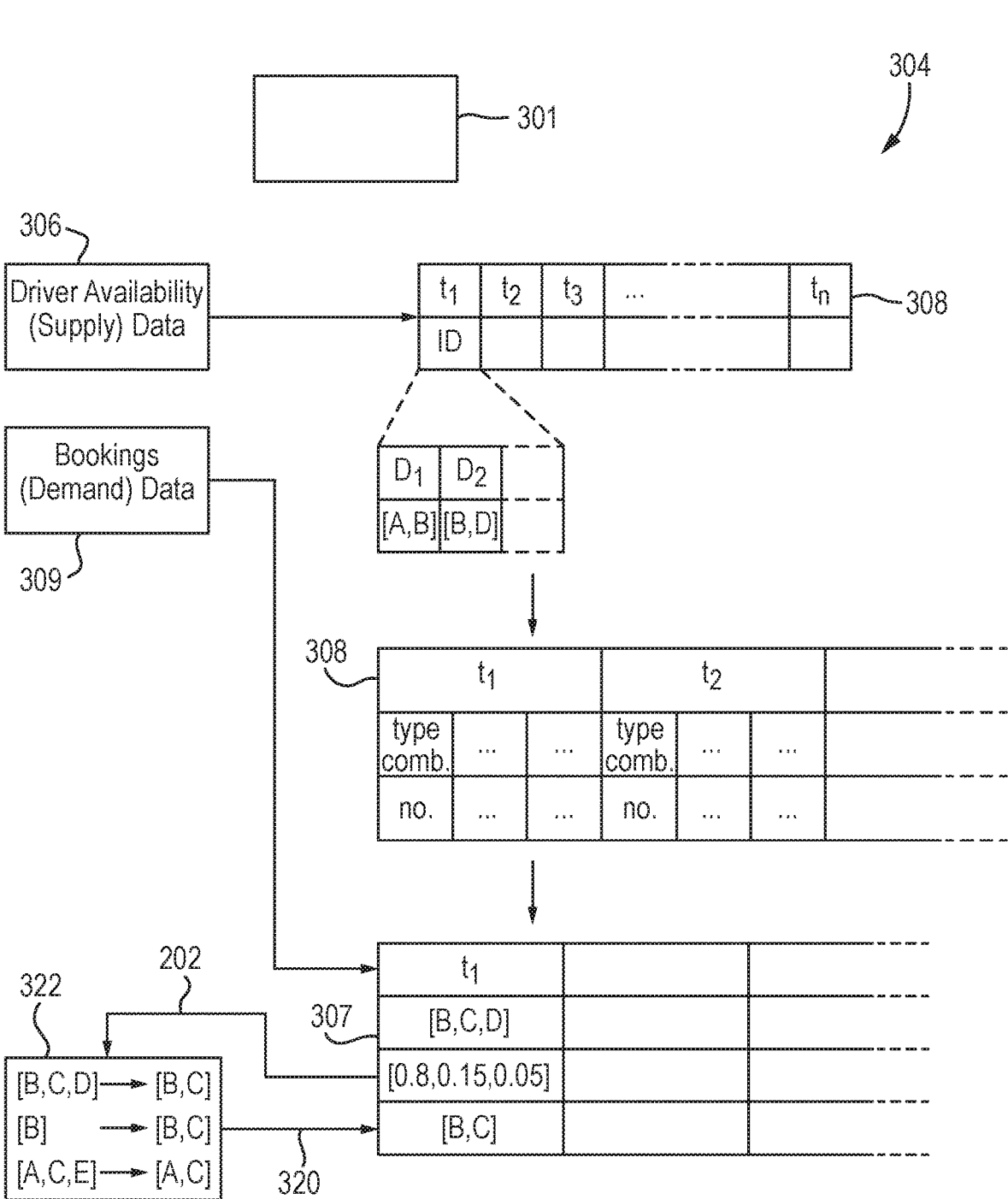
FIG. 3a is a schematic diagram illustrating a process for generating an aggregated supply and demand data stream for use in an exemplary method for simulating a supply and demand condition related to transport services, and deriving associated spatio-temporal prediction data.

Referring additionally to FIG. 3a, the steps 302 and 304 referenced above may be used to generate, at step 305, multiple data records 307, one for each respective time slot. Thus, from the driver availability data 306, data 308 is obtained indicating, for each timeslot $t_1, t_2, \ldots, t_n$, driver identity D and taxi type(s) (A, B, C, D, E, F, ...) flagged for them. From the data 308, further data 310 is generated that is indicative of, for each timeslot, the combination of active taxi types including the numbers of each active taxi type. It is this data that can be used to determine (and update), at step 301, the 'major' taxi types referenced above. From the taxi-type combinations data 310 and the bookings data 309, a data record 312 is generated for each timeslot, wherein each data record 310 for a time slot $t_1, t_2, \ldots, t_n$ comprises data 314 indicative of the combination of active taxi types (A, B, C, D, E, F, ...) recorded for the respective timeslot $t_1$, $t_2$, . . . , $t_n$ and data 316 indicative of the proportion of bookings served by each taxi type.

Referring back to FIG. 3, and using the data records 312 generated in step 305, a filtering step 320 is performed to filter active taxi-type combinations that are sufficiently common to be a so-called 'supply pool'. In respect of each data record (i.e. each timeslot), a taxi-type combination is only retained if the number of drivers with that combination of active taxi types flagged is greater than a predetermined amount (e.g. y %) and, either: the proportion of drivers (out of all drivers in the city) belonging to that taxi type is greater than some predetermined amount (e.g. 6%); or, once taxi-type combinations have been ranked from highest driver proportion to lowest driver proportion, all combinations ranked above a particular combination make up less than a predetermined proportion (e.g. φ %).

Thus, for example, with combinations [B, C, D], [B, D, F] and [A, C, E] identified from the data records 312 illustrated in FIG. 3a, it may be determined that only combinations [B, C, D] and [A, C, E] meet the required conditions, and the combination [B, D, F] is discarded. The non-'major' taxi-types (as determined in step 301) are discarded from the remaining taxi-type combinations, leaving [B, C] and [A, C], which are defined as 'supply pools'.

Finally, each possible taxi-type combination identified in step 320 is assigned to a 'supply pool' to which it is most similar, thereby defining supply pooling logic 322 in the form of a mapping of combinations of taxi-types to respective 'supply pools'. Thus, in this specific example, [B, C] and [A, C] have been designated as supply pools. The possible taxi-type combinations (excluding the non-'major' taxi types) are [B, C], [B] and [A, C]. Thus taxi-type combination [B, C] is assigned to supply pool [B, C], taxi-type combination [B] is assigned to supply pool [B, C] and taxi-type combination [A, C] is assigned to supply pool [A, C].

The data records 307 (also referred to herein as an 'aggregated supply and demand stream') may be stored, as historical data, in the database 126 of the communications server apparatus 102, but this is not essential and, as will be appreciated by a person skilled in the art, the data records 307 may be stored elsewhere, either in the communications server apparatus 102 or in a remote storage facility, such as the Cloud. The data records, including the supply pooling logic data records may be updated, periodically or continuously in near real-time using driver availability data and bookings data streams obtained from the service provider communications device 106 and the user communications device 104 respectively.

The supply pooling logic 322, generated in the manner described above, can then be used to assign a 'supply pool' to each available driver in a specified location at a specified time, based on their currently-activated taxi-type combination.

As referenced above, the broadcast and demand count features processor 142 is used to keep track, and provide data indicative, of available drivers, their locations and the time it takes for them to receive a job that has been broadcast by the communications server apparatus 102. Algorithms, such as a geohash system, are known to define specific geographical locations anywhere in the world. Such systems tend to treat an area as a series of equally sized, rectangular and adjacent cells. In an embodiment of the communications system 100, the broadcast and demand count features processor 142 may use a known geohash system defining rectangular cells of around 1.2 km×609.4 m, although this is not necessarily intended to be in any way limiting. The 'counts', representing historical and/or real-time data indicative of available drivers in each location and the time it takes for them to receive a broadcasted job (whilst at that location), may be aggregated at geohash level. However, in view of the size and configuration of each cell, simply keeping track of raw counts without some spatial smoothing (to take account, for example, of real-time movement of the driver through the area) may cause a technical difficulty due to data sparsity.

Figure 4:
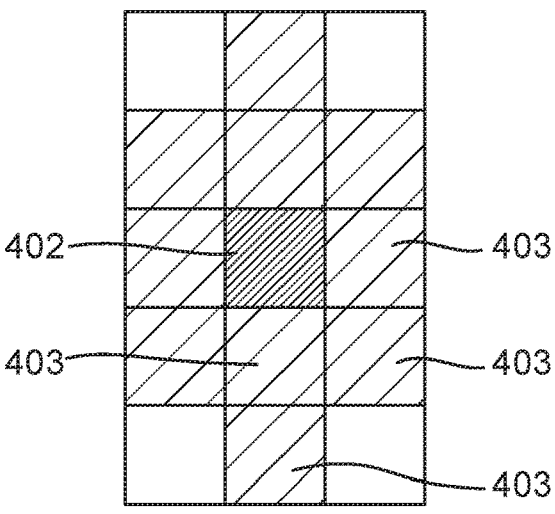
FIG. 4 is a schematic diagram illustrating a definition of a region for use in an exemplary method for simulating a supply and demand condition related to transport services, and deriving associated spatio-temporal prediction data.

Therefore, the broadcast and demand count features processor 142 performs spatial smoothing of the count data, for example, as follows. Referring to FIG. 4 of the drawings, each available driver (derived from historical driver availability data and/or a driver availability data stream) is counted as available in their current geohash 402 and also the geohashes 404 within a predetermined radius, e.g. 3 km. The set of geohashes 402, 404 thus defined for a driver's current 'location' will be referred to herein as a 'region'.

Figure 4A:
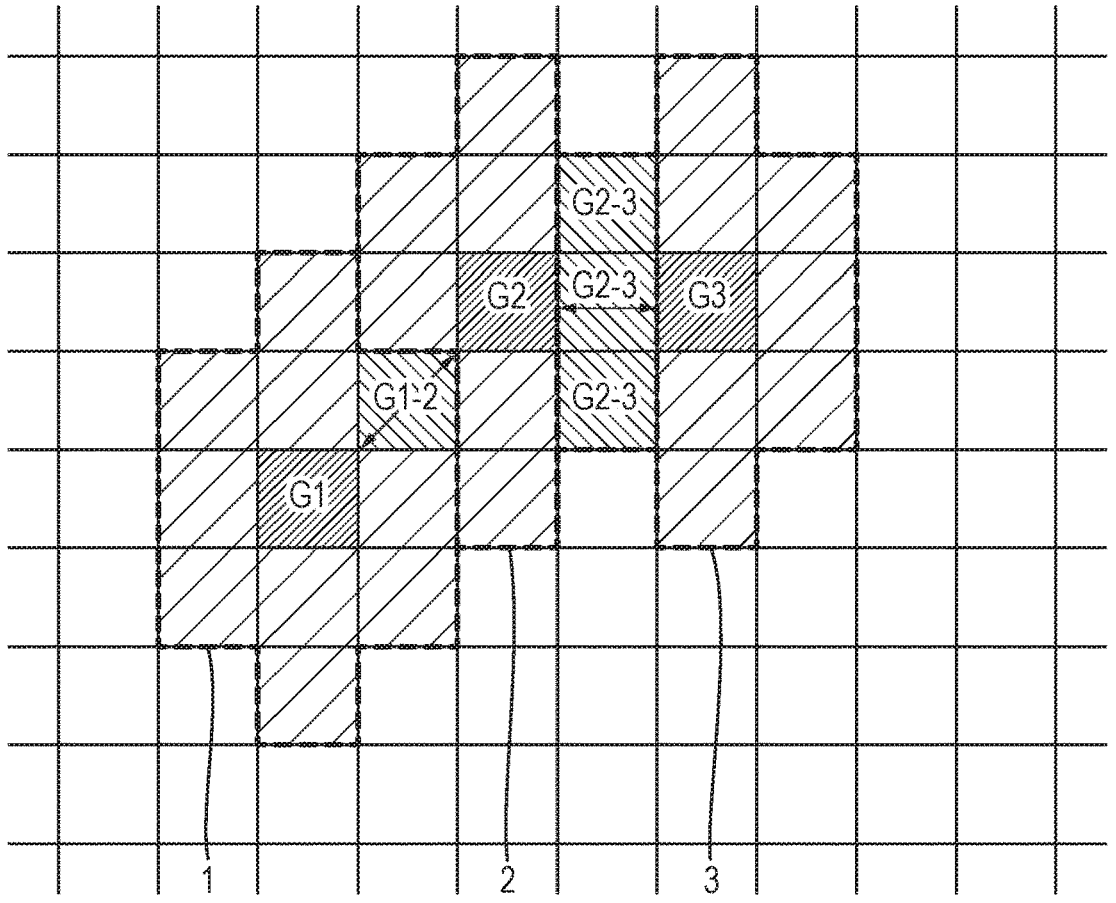
FIG. 4a is illustrative of movement of a driver between three notional regions.

Thus, and referring to FIG. 4a of the drawings, a driver may become available (as indicated by the driver availability data) in geohash G1 at time t1, then (as far as the driver availability stream data is concerned), that driver becomes available in region 1 at t1. The driver, as they move through the region, drives into geohash G1-2 and continues to be available in region 1. Thus the time the driver entered geohash G1-2 is also noted as t1. The driver then drives into geohash G2 at time t2. Since the driver is now out of region 1, they become available in region 2 and the time they entered G2 (and region 2) is noted as t2. Similarly, as they continue to drive, the time they enter geohash G2-3 is also noted as t2 because it is still in region 2. The driver then enters geohash G3, leaving region 2, so a time t3 is noted as the time they enter region 3, etc. Consider that a driver receives a job J1 in geohash G3 at time t4. As a result, the time-to-broadcast calculated for G1 and region 1 (including G1-2) will be t4-t1, the time-to-broadcast at G2 and region 2 (excluding G1-2 and including G2-3) will be t4-t2, and the time-to-broadcast at G3 (and region 3 (excluding G2-3) will be t4-t3.

The broadcast and demand count features processor 142 records in respect of sequential (e.g.) 15-minute periods, for each supply pool, geohash and 15-minute slot, data indicating a count representative of the number of drivers whose 'time-to-broadcast' was between 0-2 mins, 2-5 mins, 5-10 mins and 10-15 mins, and also a count indicative of the number of drivers that did not receive any broadcast within that 15-minute period.

Figure 4B:
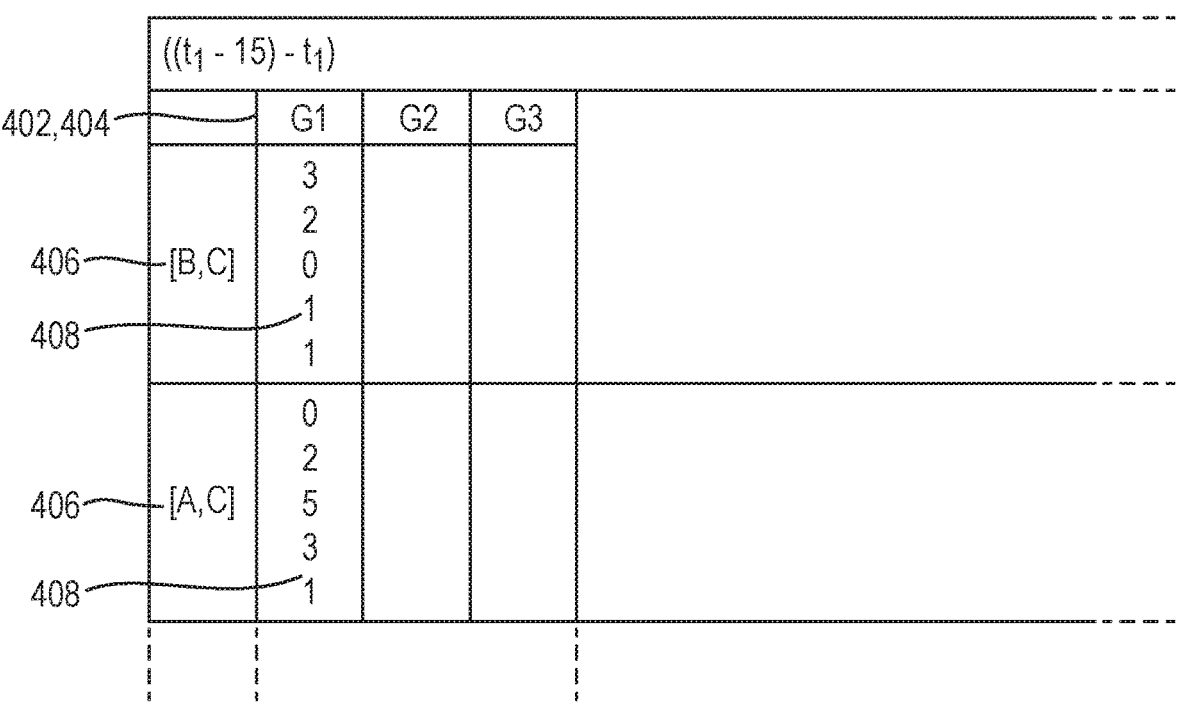
FIG. 4b is illustrative of a data record generated by a broadcast and demand count processor of an exemplary communications server apparatus for simulating a supply and demand condition related to transport services, and deriving associated spatio-temporal prediction data.

Thus, referring to FIG. 4b of the drawings, the broadcast and demand count processor 142 generates a data record comprising, for each 15-minute period $(t_n–15-t_n)$, a data record indicative of each geohash in a region 402, 404 (G, G1-2 . . . , G2, G2-3, . . . G3, . . . ), a supply pool 406 (e.g. [B,C], [A,C]) and a number of available drivers 408 counted for each time category: 0-2 mins, 2-5 mins, 5-10 mins and 10-15 mins, and also a number to represent the number of drivers that did not receive any broadcast during the respective 15-minute period. The figures inserted for these periods of time in the illustration of FIG. 4a are provided purely by way of example.

The labels processor 144 is configured to generate labels that are constructed as estimates of the actual probability of receiving a job in X minutes for each supply pool/geohash/2-minute slot. The labels processor is configured to utilise data stored in a driver location and bookings datastore, for example hosted by the database 126 of the communications server apparatus 102. The driver locations and bookings datastore receives and stores driver location and availability data and bookings data received from the service provider communications device 104 and the user communications device 104 whilst the communications system 100 is in use. The labels are updated periodically to take into account new data that has been received and stored since the last update.

In order to calculate the probability of a driver receiving a job (broadcast) in X minutes for each supply pool (to which the driver belongs)/geohash/2-minute time slot, a method of generating labels is performed, wherein an item of label data is generated for each supply pool/geohash/2-minute time slot, and the result is a databank representing data records, wherein each data record carries a set of probabilities for a specified (e.g. 2-minute) timeslot, each probability value being associated with a supply pool/geohash combination.

Figure 5A:
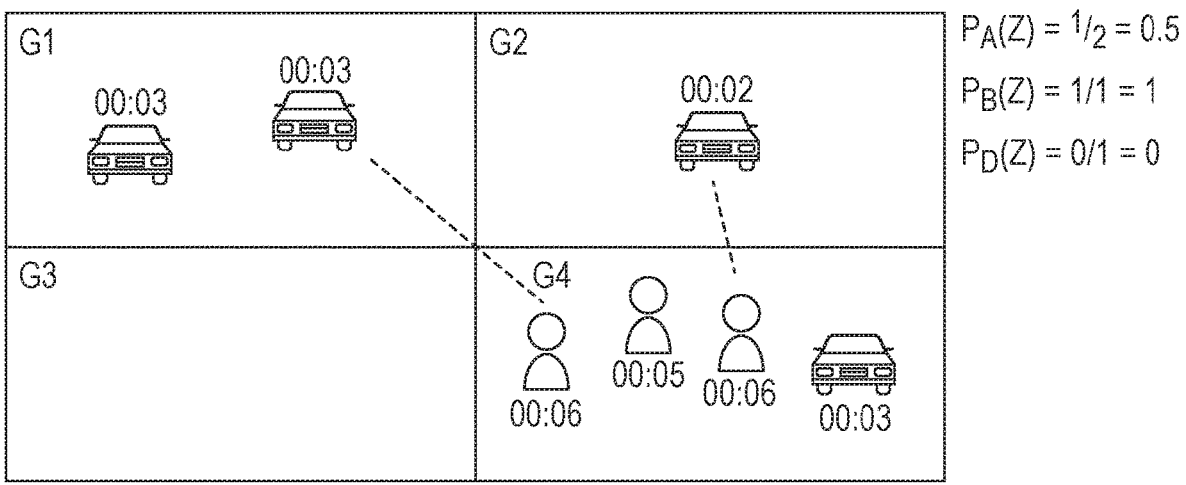
FIGS. 5a to 5f are illustrative of respective steps of a method of calculating probabilities that one or more drivers will receive a broadcast in a respective geohash within X minutes.
Figure 5B:
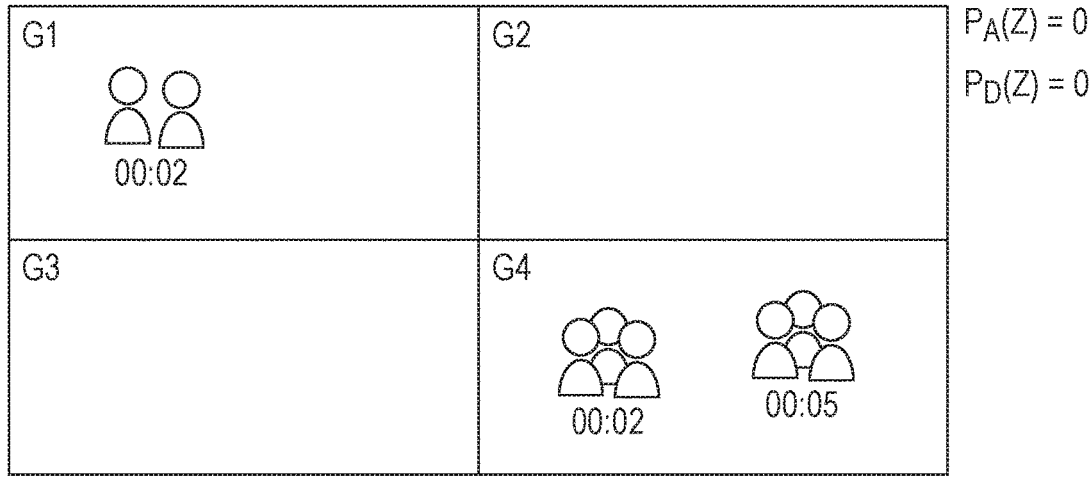

The process starts by calculating an initial estimate of empirical probability. Thus, data is gathered, each label data instance being indicative of a number of drivers belonging to a specified supply pool/geohash/2-minute time slot combination. Referring to FIG. 5*a* of the drawings, in step 502, the labels processor derives (from the driver location/availability data) data indicative of the number B of drivers belonging to a specified supply pool who were present and available for broadcasts in a specified geohash at the beginning of a specified 2-minute slot. Then, out of these drivers, the labels processor, additionally using the bookings data, determines the number A of those drivers that received a job broadcast within X minutes. The initial probability is calculated by calculating the empirical ratio A/B. If B=0, the probability is also estimated as 0. It can be seen from FIG. 5*a* that there are 2 available drivers in geohash G1, 1 available driver in geohash G2, 0 available drivers in geohash G3 and 1 available driver in geohash G4. One of the drivers in geohash G1 received a job broadcast and one of the drivers in geohash G2 received a job broadcast. Thus, the empirical ratio for calculating initial probability results in a probability (for the specified timeslot 00:02 to 00:04) of ½ for geohash G1, 1 for geohash G2, and 0 for geohashes G3 and G4. However, as shown in FIG. 5*b*, for the case where there was demand in geohashes G1 and G4 but no available drivers, the probabilities for all of the geohashes G1-G4 comes out at 0, which cannot be correct. Thus, it is clear that the probability calculation needs to be adjusted to take into account demand, especially when there are no available drivers in a specified geohash.

Figure 5C:
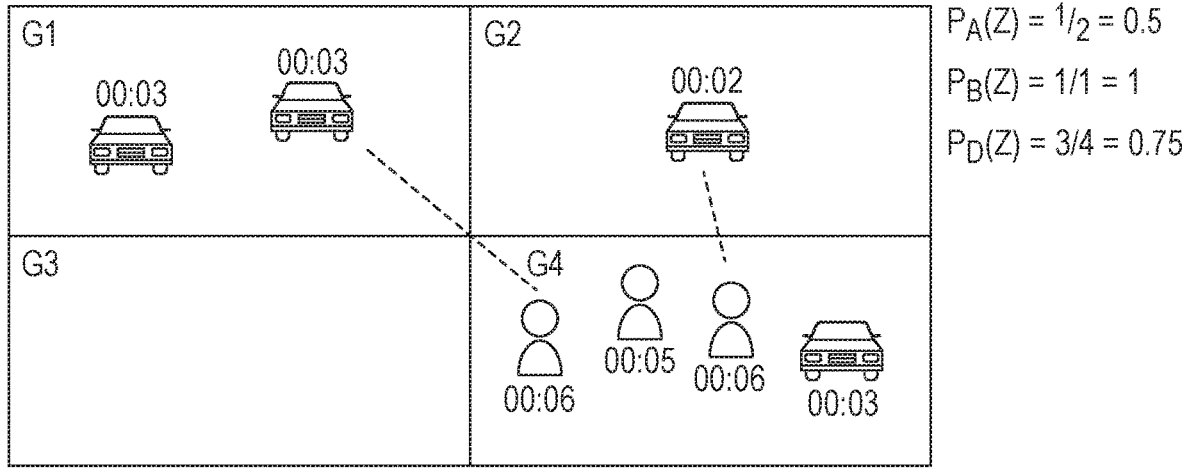
Figure 5D:
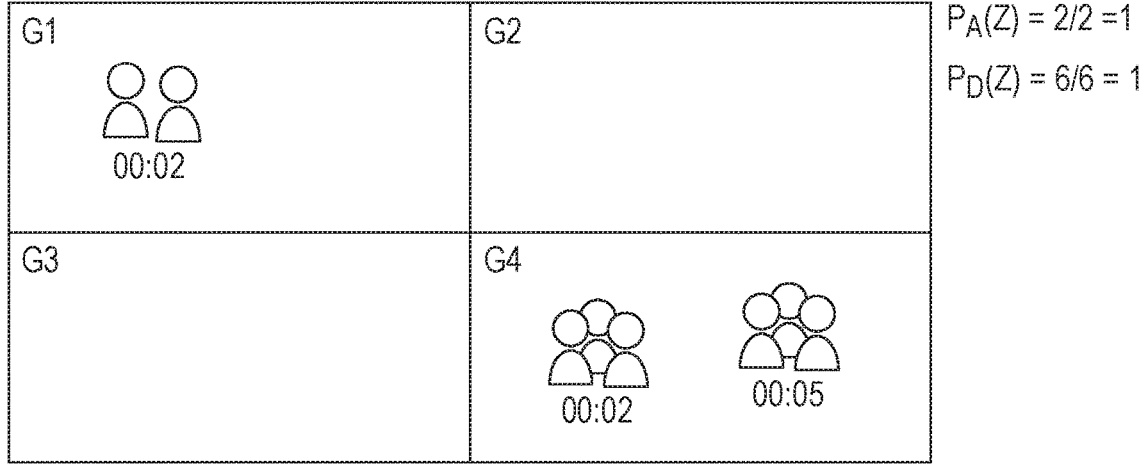

Accordingly, and referring to FIG. 5*c* of the drawings, in order to adjust for demand, the demand count D belonging to the specified supply pool and arising in a specified geohash in the next X minutes is added to the numerator and the denominator of the empirical ratio, making the calculation (A+D)/(B+D). In this specific example, the demand count D is 3. Thus, for the first case described above, the probabilities for each of the four specified geohashes, becomes ½, 1, 0 and ¾=0.75. In the second case described above, the probability estimates become 1 for geohashes G1 and G4. This aspect deals with situations where there are no drivers in the geohash and A and B are both 0, or where the number of drivers in a geohash is small and conventional empirical probability estimates using a small number of drivers is inaccurate.

Figure 5E:
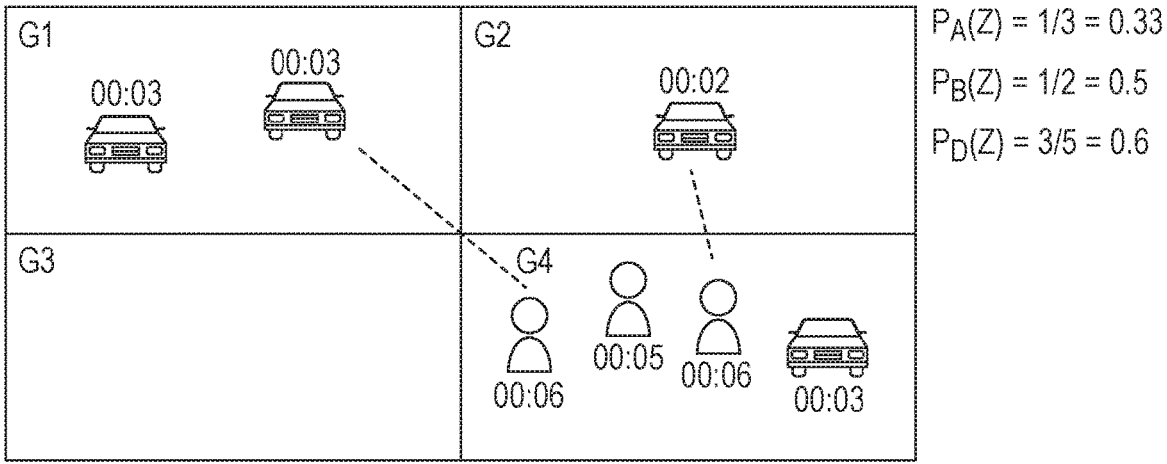
Figure 5F:
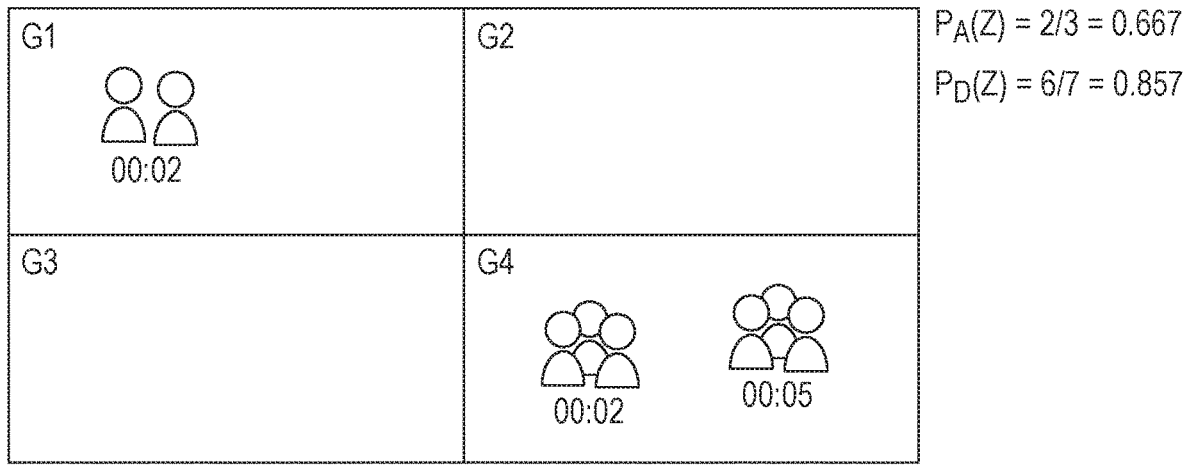

Further adjustment is needed to differentiate between high denominator and low denominator situations, so as to enable the calculation to differentiate between situations where the total number of drivers is large and those where it is small. For example, 1 driver receiving a job out of 1 available driver will result in a probability of 1/(1+1)=0.5; whereas 100 drivers receiving jobs out of 100 available drivers will result in a probability of 100/(100+1)=0.990. In order to effect this adjustment in an exemplary technique, '1' is added to the denominator. Referring to FIG. 5*e* of the drawings, in the first case described above, this makes the probabilities for each of geohashes G1, G2 and G4 ⅓, ½ and ⅗, respectively, with the probability associated with geohash G3 remaining 0. Referring to FIG. 5*f* of the drawings, in the second case described above, the probabilities for geohashes G1 and G4 become ⅔ and 6/7, with the probabilities for geohashes G2 and G3 remaining 0.

Figures 5G, 6:
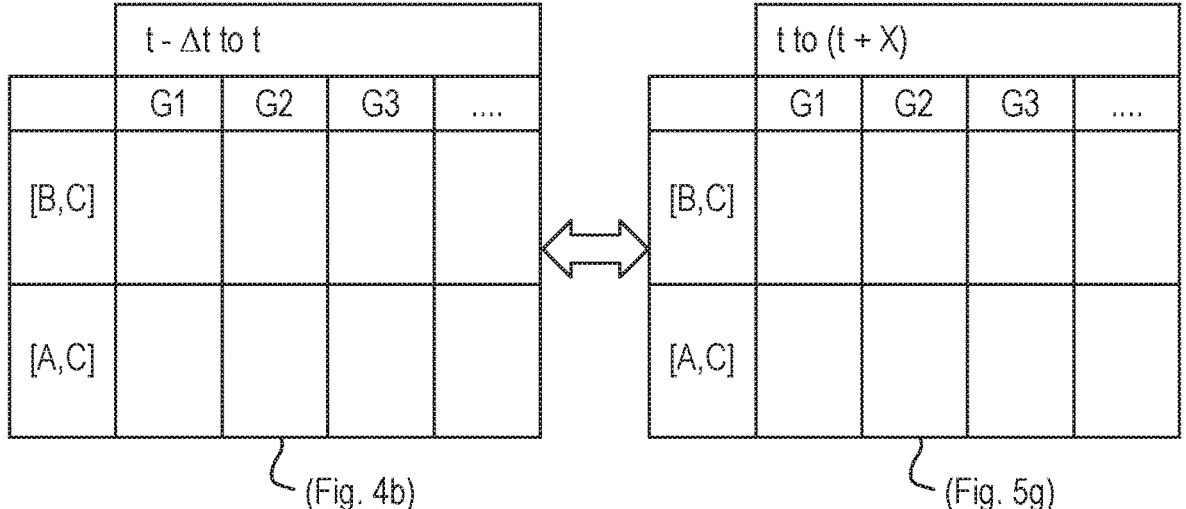
FIG. 5g is illustrative of a data record generated by a labels processor of a an exemplary communications system including a communications server apparatus for simulating a supply and demand condition related to transport services, and deriving associated spatio-temporal prediction data.
FIG. 6 is illustrative of a mapping of an aggregated supply and demand stream to respective labels data in an exemplary method for simulating a supply and demand condition related to transport services, and deriving associated spatio-temporal prediction data.

The above process is repeated for each 2-minute slot and in respect of each supply pool/geohash combination to produce a databank of probabilities, as illustrated in FIG. 5*g*, wherein each probability calculation as set out above is performed and a datastore 503 is populated and periodically updated to take account of latest conditions. Exemplary label data records generated by the labels processor 144 are illustrated schematically in FIG. 5*g*. The broadcast data records generated by the broadcast and demand count processor 142 (as illustrated in FIG. 4*b* of the drawings) are matched or correlated with the label data records generated by the labels processor 144 (as illustrated in FIG. 5*g* of the drawings). It can be seen, from FIG. 6 that the timeslots for the broadcast and demand data records can be defined as (t−Δt) to t, and the timeslots for the labels data can be defined as t to (t+X). The parameters and characteristics of the data stored in both records is such that the entries for any given timeslot can be directly mapped to each other, and, subsequently, such mapping data, as well as the data records themselves are fed into the training model processor as a training set. This data ensures that the model is trained to forecast probabilities of an available driver in a specified supply pool getting a broadcast in the next X minutes, based on data collected in the past Δt minutes. As previously stated, many possible forecasting models can be utilised in the communications system 100, including gradient boosted decision trees, multi-layer perceptrons, convolutional neural networks with long short term memory layers, ARIMA models, etc, and these and others will be readily apparent to a person skilled in the art.

The output of the model training processor is fed to the forecasting module which is configured to perform calculations or simulations to generate, based on the current driver location and availability data stream and the bookings data stream, predicted probabilities of an available driver receiving a broadcast within X minutes. The predicted probability data is output in association with a supply pool/geohash/timeslot identifier, in a manner similar to that described with reference to FIG. 5*g*. The predicted probability data for a specified supply pool is transferred to a heatmap service, which is an API service acting as an interface for one or more service provider (i.e. driver) communications devices 106. The heatmap service uses the precited probabilities to generate heatmap display data for use by only the relevant service provider communications devices 106, i.e. only those for available drivers associated with the supply pool(s) to which the predicted probability data applies. The heatmap display data is used by the receiving service provider communications device(s) 106 to generate a heatmap display on the screen of the respective service provider communications device(s) 106 so as to present the driver with a visual representation indicative of the locations within a specified region that they are most (and, optionally, least) likely to receive a broadcast within X minutes.

Referring to FIG. 7 of the drawings, a communications system 100 comprising a service provider communications device and a user communications device 104 is depicted schematically. The communications server apparatus 102 and some of its individual components are omitted from FIG. 7 for the sake of clarity. A system as described above for generating spatio-temporal availability and demand data, deriving probabilities in association with respective supply pool/geohash/timeslot identifiers and forecasting such probabilities for use in a heatmap service 702 interfacing with one or more service provider communications devices 106 is illustrated. As shown, the driver location and availability data stream 306 (FIG. 3*a*) from the service provider communications device(s) 106 and the bookings data stream 309 (FIG. 3*a*) from the user communications device(s) 104, are fed to the driver location and bookings data store or database 126 of the communications server apparatus 102. The labels processor 144, optionally configured within the communications server apparatus 102, receives data from the driver location and bookings datastore 126 and generates label data, as described above with reference to FIG. 5*g*. The label data is fed to the model training processor 146, as described above. Data from the driver location and bookings datastore 126 is also used by the supply pooling logic generation (not shown) to generate the supply pooling logic 322 described above with reference to FIG. 3. The supply pooling logic data is fed to a stream processing module 705 which filters and categorizes the driver location and availability data stream 306 using the bookings data stream 704, as described above, to generate an aggregated demand and supply data stream 309, as described above with reference to FIG. 3*a*, and the aggregated demand and supply stream is fed to an archive database 706 and also to the forecasting module 708. Thus, the aggregated demand and supply data stream is used to generate historical data for use in the model training processor 146 and also to generate predictions 709, as described above, based on current demand and supply data. The predictions data is fed to a short term database 710 and a long term datastore 720.

Referring additionally to FIG. 7*a*, the predictions data 709 that is fed to the heatmap service 702, via a short term database 710 (acting as a buffer) comprises a series of data items 711. Each data item 711 comprises (at least) an identifier 712, indicative of the supply pool to which the predictions data pertains, a first value 713 indicative of the respective geohash to which the predictions data pertains, and a second value 714 indicative of the probability that an available driver in the respective supply pool will receive a broadcast within X minutes.

In order to receive data representative of the predictions data 709, a service provider communications device 106 transmits a request, over the communications network 108, to the heatmap service 702, and the heatmap service 702 returns a response in the form of heatmap data representative of selected predictions data 709 associated only with the supply pool(s) containing the taxi type(s) that are 'switched on' for the driver using the service provider communications device 106.

Thus, the exemplary communications system 100 provides an end-to-end system wherein driver location and availability data is collected from drivers' mobile devices, and bookings data (passenger requests) is collected from users' mobile devices. The raw location and availability data is aggregated and combined with bookings data, to generate an aggregated demand and supply stream (as described with reference to FIG. 4*b*), and combined with labels data (as described with reference to FIG. 5*g*, and then fed into a pre-trained model in real-time. Model training uses the same data source and is scheduled to be updated periodically. The predictions generated by the pre-trained model are then served back into the drivers' mobile devices through a heatmap (API) service.

The model will experience a loss of performance over time as supply and demand relationships in individual regions alter. In some cases, this can happen very suddenly. In other cases, the degradation takes place over a longer period.

Thus, in some implementations of the techniques described above, a model retraining pipeline may be implemented that monitors model performance and retrains if or when performance is deemed to have dropped below a predetermined threshold. Such model retraining pipeline facilitates the optimisation of resources when retraining the model, since training iterations can be optimised and timed for maximum impact. In some implementations, such model performance may be monitored and, when a drop in performance is detected, a correlation between the drop in model performance and the supply and/or demand conditions that caused the drop may be performed.

In a model retraining process, the data on which good model performance is achieved and data on which poor model performance is detected can both be utilised in retraining the model. In order to identify the data that has caused the drop in performance, control charts, such as those used in Statistical Process Control, or 'prime' charts may, for example, be used, as will be known to a person skilled in the art. The input data, including the data that caused the drop in performance, is re-sampled to retrain the model. As a result, supply and demand distributions within the forecasting model can be smoothed and shaped each time the model is retrained in order to avoid, or at least mitigate, issues caused by extreme anomalies in demand/supply patterns.

It will be appreciated that the invention has been described by way of example only. Various modifications may be made to the techniques described herein without departing from the spirit and scope of the appended claims. The disclosed techniques comprise techniques which may be provided in a stand-alone manner, or in combination with one another. Therefore, features described with respect to one technique may also be presented in combination with another technique.

The invention claimed is:

1. A communications server apparatus for simulating supply and demand conditions related to a service or asset provision and deriving associated spatio-temporal prediction data, the communications server apparatus comprising a processor and a memory, and being configured, under the control of the processor, to execute instructions stored in the memory to:

obtain, via a service or asset provider communication device, supply and demand data, said supply data comprising service or asset provider location and availability data and said demand data comprising user request data;

generate, using said supply and demand data, aggregated supply and demand data comprising a plurality of data records associated with a plurality of respective predetermined time periods, each record being representative of an available supply pool of one or more service provider/asset types in one of a plurality of regions, and demand therefore, during the respective predetermined time period;

generate, using said supply and demand data, probability data for each of said plurality of regions and supply pools in relation to respective predetermined time slots, said probability data comprising probability values indicating a likelihood of demand associated with each respective time slot in each region for each supply pool;

store the supply and demand data as historical supply and demand data in a database, the database accessed to generate a training data set comprising aggregated supply and demand data and probability data derived from historical supply and demand data for the plurality of regions;

generate, via a supply pooling logic processor, supply pooling logic for mapping a service or asset provider type to a supply pool by deriving one or more supply pools based on historical supply and demand data obtained from said database, and grouping sets of one or more service or asset provider types into supply pools representing greatest demand in a region during each of a plurality of predetermined time periods;

perform, via a broadcast and demand processor, a simulation of supply and demand conditions in said plurality of regions by mapping said aggregated supply and demand data to said probability data in a trained forecasting model, the trained forecasting model periodically trained on the training data set, and generate, via a forecasting processor, prediction data comprising a predicted probability for each of said plurality of regions and supply pools, wherein said predicted probability indicates a probability that a service or asset provider will receive a user request in a specified region within a predetermined period of time;

store the prediction data in a short term database and a long term database, wherein the short-term database stores a rolling set of data items for each combination of supply pool, geohash and timeslot, and wherein the long-term database provides an archive of historical prediction data;

receive, at an API service, a request from the service or asset provider communication device to identify a current geohash region and supply pool associated with the service or asset provider communication device;

render, on the service or asset provider communication device, a spatio-temporal heatmap display which displays booking likelihoods in the current geohash region and adjacent geohash regions; and output, via the API service, a set of said predicted probabilities for said plurality of regions and supply pools, the set of said predicted probabilities retrieved from the short term database, such that the set of predicted probabilities for a specified supply pool is provided to the service or asset provider communication device belonging to a service provider/asset type of that supply pool, wherein the API service is a heatmap service configured to transmit a filtered subset of said predicted probabilities corresponding to the current geohash region and supply pool associated with the service or asset provider communication device for rendering, on a graphical user interface of the service or asset provider communication device, of the spatio-temporal heatmap display representative of the booking likelihoods in the current geohash region and adjacent geohash regions within a predetermined time period.

2. A communications server apparatus according to claim 1, further configured to only output a set of said predicted probabilities for each supply pool for display on communications devices of service or asset providers recorded as belonging to a service provider/asset type of the respective supply pool.

3. A communications server apparatus according to claim 1, for simulating supply and demand conditions related to a transport service, wherein said demand data comprises user bookings data.

4. The communications server apparatus of claim 1, further configured to generate said aggregated supply and demand data by generating sequential data records, each representative of a predetermined time period and comprising data representative of demand during each of a plurality of time slot in relation to specified supply pools.

5. The communications server apparatus of claim 1, further configured to generate said probability data for each time slot in each region for each supply pool by calculating a probability value based on supply and demand in the respective region during the respective predetermined time period, adjusted to take account of low supply and/or demand conditions.

6. The communications server apparatus of claim 5, further configured to calculate said probability value for each time slot in each region for each supply pool using an adjusted empirical probability calculation for that time slot, region and supply pool wherein a demand count from another time period for the same region and supply pool is added to the numerator and denominator thereof.

7. The communications server apparatus of claim 5, further configured to calculate said probability value for each time slot in each region for each supply pool using an adjusted empirical probability calculation wherein 1 is added to the denominator.

8. The communications server apparatus of claim 1, further configured to monitor the performance of said forecasting model and to perform a retraining process in respect thereof in the event that said performance drops below a predetermined threshold.

9. The communications server apparatus of claim 8, wherein said retraining process comprises determining the aggregated supply and demand data that caused a drop in said performance of the forecasting model, and re-sampling aggregated supply and demand data and probability data including the aggregated supply and demand data that caused a drop in said performance, to generate a new training data set for use in retraining said forecasting model.

10. A method, performed in a service provider communications server apparatus, for simulating supply and demand conditions related to a service or asset provision and deriving associated spatio-temporal prediction data, the method comprising, under control of a processor of the communications server apparatus:

obtaining, via a service or asset provider communication device, supply and demand data, said supply data comprising service or asset provider location and availability data and said demand data comprising user request data;

generating, using said supply and demand data, aggregated supply and demand data comprising a plurality of data records associated with a plurality of respective predetermined time periods, each record being representative of an available supply pool of one or more service or asset provider types in one of a plurality of regions, and demand therefore, during the respective predetermined time period;

generating, using said supply and demand data, probability data for each of said plurality of regions and supply pools in relation to respective predetermined time slots, said probability data comprising probability values indicating a likelihood of demand associated with each respective time slot in each region for each supply pool;

storing the supply and demand data as historical supply and demand data in a database, the database accessed to generate a training data set comprising aggregated supply and demand data and probability data derived from historical supply and demand data for the plurality of regions;

generating, via a supply pooling logic processor, supply pooling logic for mapping a service or asset provider type to a supply pool by deriving one or more supply pools based on historical supply and demand data obtained from said database, and grouping sets of one or more service or asset provider types into supply pools representing greatest demand in a region during each of a plurality of predetermined time periods;

performing, via a broadcast and demand processor, a simulation of supply and demand conditions in said plurality of regions by mapping said aggregated supply and demand data to said probability data in a trained forecasting model, the trained forecasting model periodically trained on the training data set, and generating, via a forecasting processor, prediction data comprising a predicted probability for each of said plurality of regions and supply pools, wherein said predicted probability indicates a probability that a service or asset provider belonging to a service provider/asset type of a specified supply pool will receive a user request in a specified region within a predetermined period of time;

storing the prediction data in a short term database and a long term database, wherein the short-term database stores a rolling set of data items for each combination of supply pool, geohash and timeslot, and wherein the long-term database provides an archive of historical prediction data;

receiving, at an API service, a request from the service or asset provider communication device to identify a current geohash region and supply pool associated with the service or asset provider communication device;

rendering, on the service or asset provider communication device, a spatio-temporal heatmap display which displays booking likelihoods in the current geohash region and adjacent geohash regions; and outputting, via the API service, a set of said predicted probabilities for said plurality of regions and supply pools, the set of said predicted probabilities retrieved from the short term database, such that the set of predicted probabilities for a specified supply pool is provided to the service or asset provider communication device belonging to a service provider/asset type of that supply pool, wherein the API service is a heatmap service configured to transmit a filtered subset of said predicted probabilities corresponding to the current geohash region and supply pool associated with the service or asset provider communication device for rendering, on a graphical user interface of the service or asset provider communication device, of the spatio-temporal heatmap display representative of the booking likelihoods in the current geohash region and adjacent geohash regions within a predetermined time period.

11. A method according to claim 10, wherein outputting said set of predicted probabilities for said plurality of regions and supply pools comprises only outputting a set of predicted probabilities for each supply pool for display on service or asset providers communications devices of service or asset providers recorded as belonging to a service provider/asset type of the respective supply pool.

12. A communications system for simulating supply and demand conditions related to a service or asset provision and deriving associated spatio-temporal prediction data, at least one user communications device and communications network equipment operable for the communications server apparatus and the at least one user communications device to establish communication with each other therethrough, and at least one service or asset provider communications device and communications network equipment operable for the communications server apparatus and the at least one service provider communications device to establish communication with each other therethrough, the service provider communications device comprising a display for displaying data representative of a plurality of geographical regions, the communications server apparatus comprising a processor and a memory, and being configured, under the control of the processor, to execute instructions stored in the memory to:

obtain, via a service or asset provider communication device, supply and demand data, said supply data comprising service or asset provider location and availability data received from said at least one service or asset provider communications device, and said demand data comprising user request data received from said at least one user communications device;

generate, using said supply and demand data, aggregated supply and demand data comprising a plurality of data records associated with a plurality of respective predetermined time periods, each record being representative of an available supply pool of one or more service or asset provider types in one of a plurality of regions, and demand therefore, during the respective predetermined time period;

generate, using said supply and demand data, probability data for each of said plurality of regions and supply pools in relation to respective predetermined time periods;

store the supply and demand data as historical supply and demand data in a database, the database accessed to generate a training data set comprising aggregated supply and demand data and probability data derived from historical supply and demand data for the plurality of regions;

generate, via a supply pooling logic processor, supply pooling logic for mapping a service or asset provider type to a supply pool by deriving one or more supply pools based on historical supply and demand data obtained from said database, and grouping sets of one or more service or asset provider types into supply pools representing greatest demand in a region during each of a plurality of predetermined time periods;

perform, via a broadcast and demand processor, a simulation of supply and demand conditions in said plurality of regions by mapping said aggregated supply and demand data to said probability data in a trained forecasting model, the trained forecasting model periodically trained on the training data set, and generate, via a forecasting processor, prediction data comprising a predicted probability for each of said plurality of regions and supply pools, wherein said predicted probability indicates a probability that a service or asset provider will receive a user request in a specified region within a predetermined period of time;

store the prediction data in a short term database and a long term database, wherein the short-term database stores a rolling set of data items for each combination of supply pool, geohash and timeslot, and wherein the long-term database provides an archive of historical prediction data;

receive, at an API service, a request from the service or asset provider communication device to identify a current geohash region and supply pool associated with the service or asset provider communication device;

render, on the service or asset provider communication device, a spatio-temporal heatmap display which displays booking likelihoods in current geohash region and adjacent geohash regions; and output, via the API service, a set of predicted probabilities for said plurality of regions and supply pools, the set of said predicted probabilities retrieved from the short term database, such that the set of predicted probabilities for a specified supply pool is provided to the service or asset provider communication device belonging to a service provider/asset type of that supply pool, wherein the API service is a heatmap service configured to transmit a filtered subset of said predicted probabilities corresponding to the current geohash region and supply pool associated with the service or asset provider communication device for rendering, on a graphical user interface of the service or asset provider communication device, of the spatio-temporal heatmap display representative of the booking likelihoods in the current geohash region and adjacent geohash regions within a predetermined time period.

13. A communications server apparatus for deriving associated spatio-temporal prediction data, the communications server apparatus comprising:

a memory comprising instructions; and a processor configured to execute instructions to:

obtain, via a service provider communication device, user request data and service provider data comprising location and availability data;

generate, using service provider data and user request data, an aggregated data comprising a plurality of data records associated with a plurality of respective predetermined time periods, each data record representative of available groups of one or more service provider types in one of a plurality of regions, and user requests, during the respective predetermined time periods;

generate, using the aggregated data, probability data for each of the plurality of regions and the groups associated with the respective predetermined time periods, wherein the probability data comprises probability values indicating a likelihood of the user requests associated with each respective predetermined time period in each region for each group;

store the aggregated data as historical data in a database, wherein the database is accessible to generate a training data set derived from the historical data and the probability data for the plurality of regions;

generate, via a supply pooling logic processor, a grouping logic for mapping a service provider type to a specific group from the one or more groups of service provider types based on historical data obtained from the database, and grouping sets of one or more service provider types into groups representing highest number of user requests in a region during each of a plurality of predetermined time periods;

generate, via a forecasting processor, using the mapping, a prediction data comprising a predicted probability for each of the plurality of regions and groups, wherein the predicted probability indicates a probability that a service provider receives a user request in a specified region within a respective predetermined time period;

store the prediction data in a short term database and a long term database, wherein the short-term database stores a rolling set of data items for each combination of grouping, geohash and timeslot, and wherein the long-term database provides an archive of historical prediction data;

receive, at an API service, a request from the service provider communication device to identify a current geohash region and group associated with the service provider communication device;

render, on the service or asset provider communication device, a spatio-temporal heatmap display which displays booking likelihoods in the current geohash region and adjacent geohash regions; and output, by the API service, a set of the predicted probabilities for the plurality of regions and the groups, wherein the set of the predicted probabilities are retrieved from the short term database, such that the set of the predicted probabilities for a specified group is provided to the service provider communication device belonging to a service provider type of that group, wherein the API service is a heatmap service configured to transmit a filtered subset of the predicted probabilities corresponding to the current geohash region and group associated with the service provider communication device for rendering, on a graphical user interface of the service provider communication device, of the spatio-temporal heatmap display representative of the booking likelihoods in the current geohash region and adjacent geohash regions within a predetermined time period.

* * * * *